United States Patent
Kellner

(10) Patent No.: US 10,232,889 B2
(45) Date of Patent: Mar. 19, 2019

(54) BODY PART ARRANGEMENT FOR A MOTOR VEHICLE, AND METHOD FOR PRODUCING A BODY PART ARRANGEMENT OF SAID TYPE

(71) Applicant: Dr. Ing. h.c. F. Porsche Aktiengesellschaft, Stuttgart (DE)

(72) Inventor: Philipp Kellner, Weil der Stadt (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/695,025

(22) Filed: Sep. 5, 2017

(65) Prior Publication Data
US 2018/0079454 A1  Mar. 22, 2018

(30) Foreign Application Priority Data
Sep. 22, 2016 (DE) .......... 10 2016 117 903

(51) Int. Cl.
| | |
|---|---|
| *B62D 25/20* | (2006.01) |
| *B62D 29/04* | (2006.01) |
| *H02G 3/04* | (2006.01) |
| *B29K 21/00* | (2006.01) |
| *B29K 309/08* | (2006.01) |
| *B29L 31/30* | (2006.01) |

(52) U.S. Cl.
CPC .......... *B62D 25/20* (2013.01); *B62D 29/04* (2013.01); *H02G 3/045* (2013.01); *H02G 3/0437* (2013.01); *B29K 2021/003* (2013.01); *B29K 2309/08* (2013.01); *B29L 2031/3005* (2013.01)

(58) Field of Classification Search
CPC ...... B62D 25/20; B62D 29/04; H02G 3/0437; B29L 2031/3005
USPC .................... 296/187.08, 204, 208
See application file for complete search history.

(56) References Cited

U.S. PATENT DOCUMENTS

| | | | | |
|---|---|---|---|---|
| 5,190,803 A | * | 3/1993 | Goldbach | ........... B29C 37/0085 264/261 |
| 5,354,114 A | * | 10/1994 | Kelman | ............... B60H 1/0055 296/192 |
| 6,421,979 B1 | * | 7/2002 | Fischer | .................. B29C 65/56 403/363 |
| 6,503,585 B1 | * | 1/2003 | Wagenblast | ...... B29C 45/14467 108/51.11 |
| 6,955,394 B1 | * | 10/2005 | Reddig | ................ B62D 25/142 296/193.02 |
| 7,284,789 B2 | * | 10/2007 | Wolf | .................... B62D 25/145 180/90 |

(Continued)

FOREIGN PATENT DOCUMENTS

| | | |
|---|---|---|
| DE | 102012112540 A1 | 6/2014 |
| DE | 102013101801 A1 | 8/2014 |
| DE | 102014005001 A1 | 10/2015 |

*Primary Examiner* — Jason S Morrow
*Assistant Examiner* — E Turner Hicks
(74) *Attorney, Agent, or Firm* — Leydig, Voit & Mayer, Ltd.

(57) ABSTRACT

A body part arrangement for a motor vehicle includes a body part in which at least one electrical line element is integrated in a receiving material of the body part. The body part includes a molded part in which a plastics part is provided. The at least one electrical line element is embedded in the plastics part.

9 Claims, 1 Drawing Sheet

(56) References Cited

U.S. PATENT DOCUMENTS

| | | | |
|---|---|---|---|
| 7,445,274 B2 * | 11/2008 | Feith | B62D 25/142 |
| | | | 296/193.02 |
| 8,073,298 B2 * | 12/2011 | Meidar | B29C 70/72 |
| | | | 385/101 |
| 8,480,166 B1 * | 7/2013 | Readwin | B60H 1/00564 |
| | | | 296/208 |
| 2002/0030386 A1 * | 3/2002 | Neuss | B62D 25/142 |
| | | | 296/208 |
| 2007/0134452 A1 * | 6/2007 | Merkle | B60H 1/00564 |
| | | | 428/34.1 |
| 2014/0170342 A1 * | 6/2014 | Peitz | B62D 29/005 |
| | | | 428/34.1 |

* cited by examiner

BODY PART ARRANGEMENT FOR A MOTOR VEHICLE, AND METHOD FOR PRODUCING A BODY PART ARRANGEMENT OF SAID TYPE

CROSS REFERENCE TO RELATED APPLICATIONS

This application claims benefit to German Patent Application No. DE 10 2016 117 903.5, filed Sep. 22, 2016, which is hereby incorporated by reference herein.

FIELD

The invention relates to a body part arrangement for a motor vehicle, having a body part in which at least one electrical line element is integrated in a receiving material of the body part. The invention also relates to a method for producing a body part arrangement of said type.

BACKGROUND

In particular in the case of vehicles with electric drive, high electrical currents flow, for example between a high-voltage battery and an electric motor. For this purpose, thick and heavy electrical line elements must be installed in the motor vehicle. Since the electric drive and the high-voltage battery and other consumers are not necessarily arranged adjacent to one another, body channels must be provided for the laying of the electrical line elements. This however means that vehicle designers are faced with the major problem of a difficult structural space situation being complicated yet further by the laying of the electrical line elements. One solution to this problem is found for example in DE 10 2012 112 540 A1, which describes a vehicle component which is formed from a fiber composite material and in which at least one electrical line element is integrated, in particular integrally laminated. Through the integration of the electrical line elements, body parts can be easily utilized as channels for the electrical line elements. In the present case, the integral lamination of the electrical line elements imperatively necessitates separate electrical insulation of the electrical line elements. For this reason, the production method is complex and is restrictive with regard to design freedom.

SUMMARY

In an embodiment, the present invention provides a body part arrangement for a motor vehicle. The body part arrangement includes a body part in which at least one electrical line element is integrated in a receiving material of the body part. The body part includes a molded part in which a plastics part is provided. The at least one electrical line element is embedded in the plastics part.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention can eliminate one or more of the abovementioned disadvantages in a simple and inexpensive manner. A body part according to an embodiment of the invention has a molded part in which a plastics part is provided, wherein the at least one electrical line element is embedded in the plastics part. In this way, a body part for a body part arrangement having an electrical line element is realized in a particularly simple and inexpensive manner, wherein the provision of a plastics part in a molded part offers a high level of design freedom while simultaneously realizing high rigidity of the body part.

In a particularly advantageous embodiment, the plastics part is produced from a thermoplastic material, whereby the electrical line element is electrically insulated in a simple manner. In this way, a separate insulation jacket can be omitted. Furthermore, the thermoplastic material offers a high level of design freedom. In this context, it is particularly advantageous if the thermoplastic material is of fiber-reinforced, preferably glass-fiber-reinforced, design. In order to realize high rigidity of the body part arrangement with a low weight and a small structural space requirement, the plastics part may advantageously have a rib arrangement.

The molded part is advantageously produced from a metallic material, for example steel, aluminum, magnesium, or from a fiber-reinforced plastic, for example from an organic sheet. In this way, the body part arrangement is formed in a simple manner as a hybrid component, in which the electrical line element is insulated by the thermoplastic material.

To increase the rigidity of the body part arrangement, and thus of the body as a whole, in a simple manner, the at least one electrical line element is composed of a solid metal rod, for example of an aluminum, magnesium, steel or copper rod.

The molded part may advantageously be in the form of a tunnel-shaped molded part which is open at one side, whereby embedding of the plastics part is made possible in a simple manner.

In a particularly advantageous embodiment, the body part has an electrical contact means which is preferably in the form of a terminal element. In this way, it is then possible during the assembly of the body arrangement for different body part arrangements to be electrically contacted with one another by means of a screw-type or plug-in connection.

A method for producing a body part arrangement is provided according to the invention, in which method, in a first step, the molded part and the at least one electrical line element are placed into a pressing or injection-molding tool, and wherein, in a second step, the plastics part is produced, wherein the at least one electrical line element is fully enclosed in a radial direction or in a transverse direction.

Figure 1:
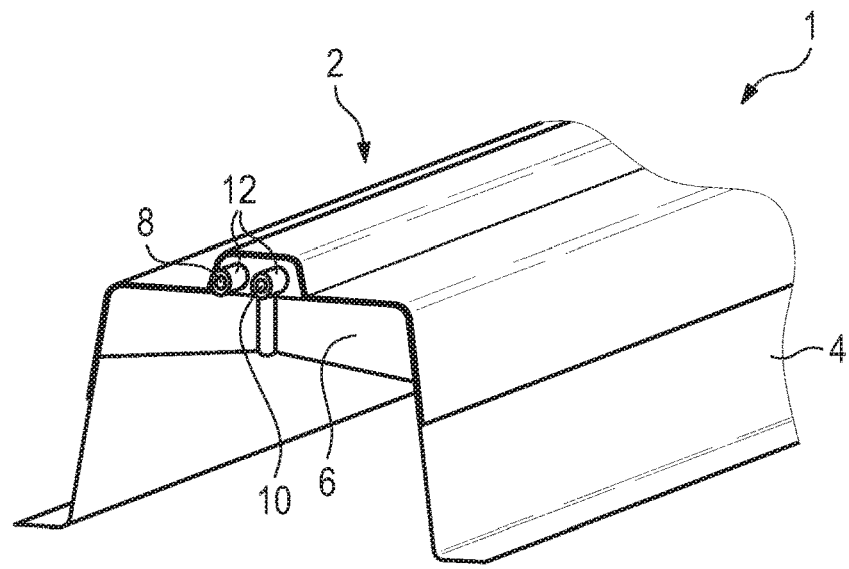
FIG. 1 shows a perspective sectional view of a body part arrangement according to an embodiment of the invention.

FIG. 1 shows a perspective sectional view of a body part arrangement 1 according to an embodiment of the invention for a motor vehicle (not illustrated in any more detail). In the present exemplary embodiment, the body part arrangement 1 is a center bracket part of the motor vehicle. The body part arrangement is, in the present exemplary embodiment, composed of a body part which has a molded part 4. The molded part 4 is in the form of a tunnel-shaped molded part which is open at one side. In the molded part 4 there is provided a plastics part 6 which, in the present exemplary embodiment, is produced from a glass-fiber-reinforced thermoplastic material. In said plastics part 6 there are embedded two electrical line elements 8, 10 which are each fully surrounded in a radial direction by the glass-fiber-reinforced thermoplastic material of the plastics part 6. As a result, an insulating jacket of the electrical line elements 8, 10 is not required. In the present exemplary embodiment, the electrical line elements 8, 10 are however each enclosed by an insulating jacket 12 of said type.

In the present exemplary embodiment, the electrical line elements have a solid copper rod, which thus makes a major contribution to the rigidity of the body part arrangement 2 according to the invention. Furthermore, the electrical line elements 8, 10 may have an electrical contact means (not illustrated in any more detail), which is for example in the form of a terminal element, in order that they can be easily coupled to further connecting parts.

In the present exemplary embodiment, the molded part 4 is produced from a fiber-reinforced plastic (organic sheet).

Figure 2:
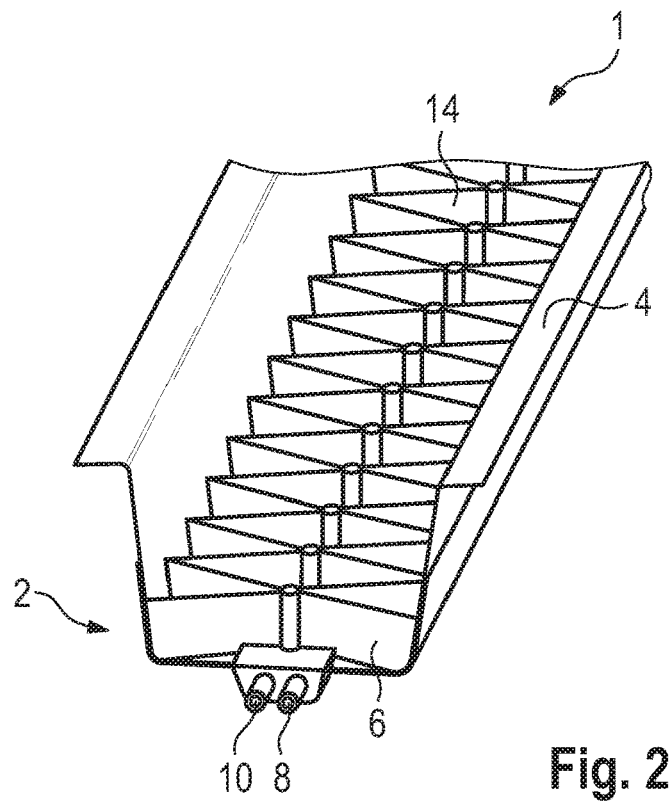
FIG. 2 shows a view from below of the body part arrangement from FIG. 1.

FIG. 2 now shows a view from below of the body part arrangement 2 from FIG. 1. Here, it can be clearly seen that the plastics part 6 has a rib arrangement 14 by means of which the rigidity of the body part arrangement 2 of lightweight construction is increased in a simple manner.

The body part 2 is produced in that, in a first step, the molded part 4 and the two electrical line elements 8, 10 are placed into a pressing or injection-molding tool (not illustrated in any more detail), and in that, in a second step, after closure of the pressing or injection-molding tool, the plastics part 6 is produced and is simultaneously connected to the molded part 4. Here, it is ensured that the electrical line elements 8, 10 are fully enclosed, in the present case in a radial direction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A body part arrangement for a motor vehicle, comprising:
    a body part in which at least one electrical line element is integrated in a receiving material of the body part,
    wherein the body part includes a molded part in which a plastics part is provided, and
    wherein the at least one electrical line element is embedded in the plastics part such that the plastics part contacts, in a radial direction, an entire exterior surface of the electrical line element and/or an insulating jacket of the electrical line element.

2. The body part arrangement as claimed in claim 1, wherein the plastics part is produced from a thermoplastic material.

3. The body part arrangement as claimed in claim 2, wherein the thermoplastic material is of glass-fiber-reinforced design.

4. The body part arrangement as claimed in claim 1, wherein the plastics part has a rib arrangement.

5. The body part arrangement as claimed in claim 1, wherein the molded part includes a metallic material or a fiber-reinforced plastic.

6. The body part arrangement as claimed in claim 1, wherein the at least one electrical line element is composed of a solid metal rod.

7. The body part arrangement as claimed in claim 1, wherein the molded part is in the form of a tunnel-shaped molded part which is open at one side.

8. The body part arrangement as claimed in claim 1, wherein the body part has an electrical contact which is in the form of a terminal element.

9. A method for producing a body part arrangement, the method comprising:
    placing a molded part and at least one electrical line element into a pressing or injection-molding tool, and
    after closure of the pressing or injection-molding tool, producing a plastics part and simultaneously connecting the plastics part to the molded part,
    wherein the at least one electrical line element is fully enclosed in a radial direction such that the plastics part contacts, in a radial direction, an entire exterior surface of the electrical line element and/or an insulating jacket of the electrical line element.

\* \* \* \* \*